United States Patent [19]

Hattori et al.

[11] Patent Number: 5,170,070
[45] Date of Patent: Dec. 8, 1992

[54] SWITCHING POWER SUPPLY AND ADAPTER FOR SWITCHING POWER SUPPLY

[75] Inventors: Masayuki Hattori, Tokyo; Shigeo Nakamura, Yamanashi; Akihiro Sakurai, Yamanashi, all of Japan

[73] Assignee: Fanuc Ltd., Minamitsuru, Japan

[21] Appl. No.: 651,369

[22] PCT Filed: Jun. 19, 1990

[86] PCT No.: PCT/JP90/00796
§ 371 Date: Apr. 11, 1991
§ 102(e) Date: Apr. 11, 1991

[87] PCT Pub. No.: WO90/16106
PCT Pub. Date: Dec. 27, 1990

[30] Foreign Application Priority Data

Jun. 20, 1989 [JP] Japan ................... 1-155880

[51] Int. Cl.⁵ .................. H02J 9/06; H02M 3/315
[52] U.S. Cl. .................................. 307/43; 307/64
[58] Field of Search ..................... 307/43, 64, 74, 75

[56] References Cited

FOREIGN PATENT DOCUMENTS 61-173322 12/1985 Japan .

Primary Examiner—A. D. Pellinen
Assistant Examiner—Aditya Krishnan
Attorney, Agent, or Firm—Staas & Halsey

[57] ABSTRACT

A switching power supply which detects a power failure within a short period and maintains the DC output voltage ($V_O$) for a long time. The switching power supply comprises a first voltage control means which controls a switching means (2) by means of a pulse width modulation means (9) which responds to a first voltage comparator means (8) which compares the DC output voltage ($V_O$) and a reference voltage ($V_R$); a second voltage control means having a pulse width modulation means working voltage range expansion means (12) which responds to a second voltage comparator means (11) which compares the DC output voltage ($V_O$) and a second reference voltage ($V_{RR}$); wherein further provision is made of a second switching means (16) for connecting a precharged second capacitor (15) in parallel to the first capacitor (1), in response to the second signal successively outputted by the second voltage comparator means (11) in a short period.

4 Claims, 7 Drawing Sheets

SWITCHING POWER SUPPLY AND ADAPTER FOR SWITCHING POWER SUPPLY

BACKGROUND OF THE INVENTION

This invention relates to an improvement applicable to a switching power supply and to an adapter employable for a switching power supply. More specifically, this invention relates to an improvement brought out for an object to enable the switching power supply to continue supplying electric power for a certain period, despite supply of the input power is suspended and to an adapter to be adapted to a switching power supply available in the prior art to enable the switching power supply to continue supplying electric power for a certain period, despite supply of the input power is suspended.

A switching power supply which is employed for supplying electric power to some of the electronic equipment employable for industrial purposes is required to continue supplying electric power for a certain period, even after supply of the input power is suspended (Hereinafter referred to as a power failure.). Otherwise, some of the electronic equipment employable for industrial purposes such as numerical control equipment (Hereinafter referred to as NC equipment.) controlling a machine tool or the like has a possibility to erroneously work, potentially resulting in breakage of the machine tool or the like controlled thereby. For the purpose to avoid these accidents, it is required to promptly detect a power failure and to allow the NC equipment or the like to take a sequential procedure to stop the function thereof without being accompanied by any malfunction, within the period in which the switching power supply keeps supplying electric power. The voltage required for the switching power supply to keep supplying during the foregoing period, however, is not the normal voltage but the minimum voltage required to allow the NC equipment or the like to conduct the foregoing limited procedure to stop the function thereof.

In this specification, the interval between a power failure and the detection thereof is called a time length for detecting a power failure, and the interval between the detection of a power failure and the time at which the voltage of the switching power supply has decreased to the foregoing minimum voltage is called a time length wherein the DC output voltage $V_O$ is held.

Available in the prior art are two exemplary switching electric power supplies which are able to keep supplying electric power for a certain period, even after supply of the input electric power is suspended.

A first example of a prior art switching power supply having the ability to continue supplying electric power after a power failure will not be discussed.

This switching power supply includes a rectifier and a switching circuit to intermit the DC current, wherein a means for detecting a power failure is attached to the AC circuit.

Referring to FIG. 1 the switching power supply in accordance with the first example available in the prior art is provided with a rectifier 40 which rectifies an AC voltage $V_I$ into a DC voltage, a capacitor 1, a switching means 2, a transformer 3, a diode 4, a flywheel diode 5, an inductance 6, a smoothing capacitor 7, a first voltage comparator 8 which compares the DC output voltage $V_O$ and a reference voltage $V_R$, a pulse width modulation means 9, and a means for detecting a power failure 10.

The DC current flowing out of the rectifier 40 is charged into the capacitor 1. The switching means 2 is closed during a period $\Delta T$ out of a predetermined clock period T. The ratio of the period $\Delta T$ and the clock period T (Hereinafter referred to as a duty ratio $\Delta T/T$) is automatically determined by a pulse width modulation means 9 referred to later, to be suitable to maintain the DC output voltage $V_O$ at a predetermined value, regardless of variation in the AC input voltage $V_I$ and variation in a load of the switching power supply. In response to the intermittent current flowing in the primary winding 31 of the transformer 3, an intermittent voltage is induced in the secondary winding 32 of the transformer 3. This intermittent voltage supplies electric power out of the switching power supply to the load through the diode 4, the inductance 6 and the smoothing capacitor 7. During the period $\Delta T$ in which the switching means 2 is closed, the electric power is directly supplied to the load and during the period ($T\Delta T$) in which the switching means 2 is open, the electric power stored in the inductance 6 is discharged therefrom and is supplied to the load through a flywheel diode 5 and the smoothing capacitor 6. Due to the function of the smoothing capacitor 6, the output voltage $V_O$ becomes a smooth DC voltage.

The DC output voltage $V_O$ is always monitored, and the first voltage comparator 8 compares the DC output voltage $V_O$ and the reference voltage $V_R$. In response to the voltage difference $\Delta V$, the pulse width modulation means 9 functions to determine the duty ratio $\Delta T/T$ or the ratio of the period $\Delta T$ in which the switching means 2 is closed and the clock period T. A signal representing the duty ratio $\Delta T/T$ is inputted to the switching means 2 for the ultimate purpose to maintain the DC output voltage $V_O$ at a constant value.

Since the means for detecting a power failure 10 is connected to the AC power supply which supplies electric power to the rectifier 40, a power failure can be detected very promptly or within a time length for detecting a power failure illustrated by $(t_1-t_0)$ in FIG. 2 (d). This power failure signal is immediately inputted to NC equipment or the like which is supplied electric power by the switching power supply. Therefore, the NC equipment or the like is allowed to immediately begin the sequential procedure for stop the NC equipment or the like without being accompanied by any malfunction.

Referring to FIG. 2 and the time chart, shown described below will be the behavior of the switching power supply of the foregoing first prior art example, in case of a power failure.

As is illustrated in FIG. 2 (a), an AC power supply is supposed to suspend supply of electric power at the time $t_0$. As is illustrated in FIG. 2 (b), the voltage of the capacitor 1 gradually decreases. As a result, the DC output voltage $V_O$ begins to decrease. The first voltage comparator 8, however, detects the decrease in the DC output voltage $V_O$ and inputs the voltage difference $\Delta V$ (the difference between the DC output voltage $V_O$ and the reference voltage $V_R$) to the pulse width modulation means 9. In response to this voltage difference $\Delta V$, the pulse width modulation means 9 increases the duty ratio $\Delta T/T$. As a result, the switching means 2 increases the time length in which the switching means is closed. In this manner, the DC output voltage $V_O$ is held at the reference voltage $V_R$ until the time which is illustrated by $t_2$ in FIG. 2 (c) and at which the duty ratio arrives at the predetermined maximum value. Since the switching means 2 is not allowed to increase the time length in which the switching means 2 is closed any more, however, the DC output voltage $V_O$ begins to decrease at the time $t_2$, as is illustrated in FIG. 2 (C), and it continues decreasing beyond the acceptable minimum voltage (the minimum voltage with which NC equipment or the like is allowed to stop the function thereof without being accompanied by any malfunction ) at the time $t_3$ illustrated in FIG. 2 (c). It is not sure if the NC equipment or the like continues functioning normally after the time $t_3$.

On the other hand, the means for detecting a power failure 10 detects a power failure immediately after occurrence of the power failure or at the time $t_1$ illustrated in FIG. 2 (d), and the signal is immediately inputted to NC equipment or the like. Therefore, the NC equipment or the like is allowed to begin the sequential procedure to stop the function thereof at the time $t_1$. Therefore, for the purpose to prevent NC equipment or the like from making any accidental behavior, upon a power failure, the time length $(t_3 - t_1)$ between the time $t_1$ at which the power failure is detected and the time $t_3$ at which the DC output voltage $V_O$ has decreased to the acceptable minimum voltage, is required to be longer than the time length required for NC equipment or the like to finish the procedure for bringing the equipment to a stop.

The time length $(t_3 - t_1)$ between the time $t_1$ at which the power failure is detected and the time $t_3$ at which the DC output voltage $V_O$ has decreased to the acceptable minimum voltage is the time length wherein the DC output voltage $V_O$ is held referred to above. The electrostatic capacity of the capacitor 1 included in the switching power supply is required to be selected to large enough to make the time length wherein the DC output voltage $V_O$ is held longer than the time length required for NC equipment or the like to finish the procedure for bringing the equipment to a stop.

In conclusion, the switching power supply in accordance with the foregoing first prior art example wherein a power failure is detected in the AC circuit has advantages described below.

The time length for detecting a power failure is extremely short. Since the time length $(t_3 - t_1)$ is determined by the electrostatic capacity of the capacitor 1 which is arranged between the rectifier 40 and the switching means 2, it is not necessarily difficult to make the time length wherein the DC output voltage $V_O$ is held, long enough.

Incidentally, however, the switching power supply in accordance with the foregoing first prior art example is accompanied by disadvantages described below.

Since a power failure is detected in the AC circuit, the means for detecting a power failure 10 readily detects an instanteneous voltage drop or a voltage oscillation in which the voltage which once decreased is promptly recovered, despite this instanteneous voltage drop should not be detected. Therefore, unnecessary interruption is unavoidable for NC equipment or the like supplied with electric power by the switching power supply of the foregoing first prior art example.

Further, the switching power supply of the foregoing first prior art example has a tendency to erroneously identify a distortion in the wave form of an AC voltage as a power failure. Therefore, also in this sense, the switching power supply of the foregoing first prior art example readily causes unnecessary interruption of NC equipment or the like supplied with electric power thereby.

Therefore, the switching power supply in accordance with the foregoing first prior art example is involved with a drawback wherein the reliability is not necessarily satisfactory.

This second example of a prior art switching power supply having the ability to continue supplying electric power after a power failure will now be discussed.

This switching power supply includes a switching circuit to intermit the DC current, a pulse width modulation means and a means for increasing the predetermined allowable maximum value of the duty ratio, when necessary. Detection of a power failure is conducted in the DC circuit.

Referring to FIG. 3, the switching power supply in accordance with the second example available in the prior art is provided with plural members identical to those which are symbolized 1–9 in the first prior art example. Since detection of a power failure is conducted in the DC circuit, this switching power supply accepts not only an AC input power supply but also a DC input power supply. Therefore, the rectifier 40 is illustrated in a broken line.

The switching power supply is further provided with a second voltage comparator 11 which compares the DC output voltage $V_O$ and a second reference voltage $V_{RR}$ which is predetermined to be less than the first reference voltage $V_R$ and with a pulse width modulation means working voltage range expansion means 12 which outputs a command to expand the maximum value to which the period $\Delta T$ in which the switching means 2 is closed, is allowed to increase. The value of the second reference voltage $V_{RR}$ which is selected to be less than the first reference voltage $V_R$ should not be so much less, otherwise the time length wherein the DC output voltage $V_O$ is held can not be long enough. The pulse width modulation means working voltage range expansion means 12 has a function to expand the maximum length of time $\Delta T_{max}$ until the duration period in which the switching means 2 is closed is allowed to be increased beyond a predetermined value, in response to the output signal $\Delta V_1$ of the second voltage comparator 11. Incidentally, since the second voltage comparator 11 also has a function for detecting a power failure, the output signal $\Delta V_1$ of the second voltage comparator 11 is inputted also to the NC equipment or the like.

Therefore, the NC equipment or the like commences a sequential procedure to stop the equipment without being accompanied by a malfunction, at the time illustrated by $t_1$ in FIG. 4 (c) at which the second voltage comparator 11 outputs a power failure signal $\Delta V_1$.

Referring to FIG. 4 and the time chart, shown described below will be the behavior of the switching power supply in accordance with the foregoing second prior art example in case of a power failure.

As is illustrated in FIG. 4 (a), an input AC or DC power supply is supposed to be suspended at the time $t_0$. As is illustrated in FIG. 4 (b), the voltage of the capacitor 1 gradually decreases. As a result, referring to FIG. 4 (c), the DC output voltage $V_O$ begins to decrease. Since the pulse width modulation means 9 functions, however, the duration period in which the switching means 2 is closed is increased, and the DC output voltage $V_O$ is held at the reference voltage $V_R$ until the duration period in which the switching means 2 is closed arrives at the predetermined maximum value.

After the duration period in which the switching means 2 is closed expires, the DC output voltage $V_O$ begins to decrease, and it continues decreasing beyond the acceptable minimum voltage (the minimum voltage with which NC equipment or the like is allowed to stop the function thereof without being accompanied by any malfunction) at the time $t_3$ illustrated in FIG. 4 (c). It is not sure if NC equipment or the like is able to continue the normal function after the time $t_3$.

The output signal $\Delta V_1$ which the foregoing second voltage comparator 11 outputs at the time $t_1$ is inputted to NC equipment or the like as a power failure signal.

Therefore, the time length $(t_3 - t_1)$ between the time $t_1$ at which the second voltage comparator 11 functions and the time $t_3$ at which the DC output voltage $V_O$ has decreased to the minimum voltage with which the NC equipment or the like is allowed to stop the function thereof without being accompanied by a malfunction, is the time length wherein the DC output voltage $V_O$ is held, for this example. Thus, this time length wherein the DC output voltage $V_O$ is held is required to be longer than the time length required for the NC equipment or the like to finish the procedure for bringing the equipment to a stop.

The electrostatic capacity of the capacitor 1 included in the switching power supply is required to be selected to be large enough to satisfy the foregoing requirements.

The foregoing description has clarified that the switching power supply in accordance with the foregoing second prior art example has advantages and disadvantages described below.

Since detection of a power failure is conducted for the DC output voltage $V_O$, the switching power supply is insensitive to an instanteneous voltage drop or an AC voltage oscillation or to distortion in the wave form of an AC voltage, the switching power supply is free from an unexpected or unnecessary interruption of NC equipment or the like which is supplied with electric power by the switching power supply.

Since detection of a power failure is not so fast as the switching power supply in accordance with the foregoing first prior art example, this switching power supply is involved with a drawback wherein the electrostatic capacity of the capacitor 1 can not be fully utilized to prolong the time length for detecting a power failure. In other words, because of the foregoing reasons, the time length for detecting a power failure or the length of time which NC equipment or the like is allowed to use for the sequential procedure to stop the function thereof without being accompanied by a malfunction can not be so long.

SUMMARY OF THE INVENTION

A first object of this invention is to provide a switching power supply having advantages itemized below.

Despite the time length for detecting a power failure is short, the switching power supply of the present invention is free from an unexpected sensitivity for an instanteneous voltage drop (a voltage drop which is shortly recovered) and/or for distortion of an AC wave form, resultantly being reliable insofar as detection of a power failure is concerned.

The switching power supply of the present invention is to sufficiently use the electrostatic capacity of a capacitor which accompanies a switching means, resultantly, being allowed to make the time length wherein the DC output voltage $V_O$ is held longer and to make the external dimension smaller.

The switching power supply of the present invention can be effective to prevent a malfunction of the NC ma or the like supplied electric power thereby from occurring.

A second object of this invention is to provide a switching power supply which has the advantage identical to that of the foregoing first embodiment of this invention but which is a combination of the foregoing second prior art switching power supply and an additional unit for satisfying an object identical to that of the first object.

A third object of this invention is to provide an adapter attachable to the foregoing second prior art switching power supply for satisfying the object identical to that of the first object.

To achieve the first object, one of the switching power supplies in accordance with the first embodiment of this invention is provided with:

(a) a capacitor (1) connected to a DC power supply, (b) a transformer (3) of which the primary winding (31) is connected to the capacitor (1) through a switching means (2) and of which the secondary winding (32) is connected to a series circuit including a diode (4), an inductance (6) and a capacitor (7), (c) a flywheel diode (5) connected between the cathode of the diode (4) and the negative terminal of the capacitor (7), (d) a first voltage comparator (8) for detecting the voltage difference ($\Delta V$) between the DC output voltage ($V_O$) of the inductance (6) and a reference voltage ($V_R$), (e) a pulse width modulation means (9) for regulating the duty ratio of the switching means (2) in response to the output signal ($\Delta V$) of the first voltage comparator (8), (f) a second voltage comparator (11) for detecting the voltage difference ($\Delta V_1$) between the output voltage ($V_O$) of the inductance (6) and a second reference voltage ($V_{RR}$) which is selected to be less than the first reference voltage ($V_R$), and (g) a pulse width modulation means working voltage range expansion means (12) for expanding the maximum duration period ($T_{max}$) in which the switching means (2) is closed, in response to the output signal ($\Delta V_1$) of the second voltage comparator (11), wherein the improvement is that:

(h) a second capacitor (15) which is connected to the capacitor (1) through a reverse current preventing diode (14) which is connected to the DC power supply in series, is additionally provided, (i) a second switching means (16) for by-passing the reverse current preventing diode (14), is additionally provided, and (j) a switching control means (13) for closing the second switching means (16), in response to the second voltage difference signal ($\Delta V_1$) successively outputted by the second voltage comparator (11) in a short period, is additionally provided.

To achieve the first object, the other of the switching power supplies in accordance with the first embodiment of this invention is provided with:

(a) a capacitor (1) connected to a DC power supply, (b) a transformer (3) of which the primary winding (31) is connected to the capacitor (1) through a switching means (2) and of which the secondary winding (32) is connected to a series circuit including a diode (4), an inductance (6) and a capacitor (7).

(c) a flywheel diode (5) connected between the cathode of the diode (4) and the negative terminal of the capacitor (7), (d) a first voltage comparator (8) for detecting the voltage difference ($\Delta V$) between the DC output voltage ($V_O$) of the inductance (6) and a reference voltage ($V_R$), (e) a pulse width modulation means (9) for regulating the duty ratio of the switching means (2) in response to the output signal ($\Delta V$) of the first voltage comparator (8), (f) a second voltage comparator (11) for detecting the voltage difference ($\Delta V_1$) between the output voltage ($V_O$) of the inductance (6) and a second reference voltage ($V_{RR}$) which is selected to be less than the first reference voltage ($V_R$), and (g) a pulse width modulation means working voltage range expansion means (12) for expanding the maximum duration period ($\Delta T_{max}$) in which the switching means (2) is closed, in response to the output signal ($\Delta V_1$) of the second voltage comparator (11), wherein the improvement is that:

(h) a second capacitor (15) which is connected to the capacitor (1) through a reverse current preventing diode (14) which is connected to the DC power supply in series, is additionally provided (i) a second switching means (16) for by-passing the reverse current preventing diode (14 in response to the output signal ($\Delta V_1$) of the second voltage comparator (11), is additionally provided.

Since this switching power supply has a power failure detector in the DC circuit, it is insensitive to an instantaneous voltage drop and/or distortion of an AC input wave form. Further, since this switching power supply has the second capacitor (15) which is always charged and is allowed to be connected in parallel to the capacitor (1) of the switching power supply exclusively in case of a power failure, the time length ($t_3 - t_1$) wherein the DC output voltage $V_O$) is held is prolonged.

To achieve the second object, one of the switching power supplies in accordance with the second embodiment of this invention is a combination of a switching power supply unit (30) which is identical to the switching power supply of the second prior art example and which is provided with:

(a) a capacitor (1) connected to a DC power supply, (b) a transformer (3) of which the primary winding (31) is connected to the capacitor (1) through a switching means (2) and of which the secondary winding (32) is connected to a series circuit including a diode (4), an inductance (6) and a capacitor (7), (c) a flywheel diode (5) connected between the cathode of the diode (4) and the negative terminal of the capacitor (7), (d) a first voltage comparator (8) for detecting the voltage difference ($\Delta V$) between the output voltage ($V_O$) of the inductance (6) and a reference voltage ($V_R$), (e) a pulse width modulation means (9) for regulating the duty ratio of the switching means (2) in response to the output signal ($\Delta V$) of the first voltage comparator (8), (f) a second voltage comparator (11) for detecting the voltage difference ($\Delta V_1$) between the output voltage ($V_O$) of the inductance (6) and a second reference voltage ($V_{RR}$) which is selected to be less than the first reference voltage ($V_R$), (g) a pulse width modulation means working voltage range expansion means (12) for expanding the maximum duration period ($T_{max}$) in which the switching means (2) is closed, in response to the output signal ($\Delta V_1$) of the second voltage comparator (11), and a circuit unit (40) for prolonging a time length wherein the DC output voltage ($V_O$) is held, the circuit unit (40) being provided with :

(h) a second capacitor (15) which is connected to the capacitor (1) through a reverse current preventing diode (14) which is connected to the DC power supply in series, (i) a second switching means (16) for by-passing the reverse current preventing diode (14), and (j) a switching control means (13) for closing the second switching means (16), in response to the second voltage difference signal $\Delta V_1$) successively outputted by the second voltage comparator (11) in a short period.

To achieve the second object, the other of the switching power supplies in accordance with the second embodiment of this invention is a combination of a switching power supply unit (30) which is identical to the switching power supply of the second prior art example and which is provided with;

(a) a capacitor (1) connected to a DC power supply, (b) a transformer (3) of which the primary winding (31) is connected to the capacitor (1) through a switching means (2) and of which the secondary winding (32) is connected to a series circuit including a diode (4), an inductance (6) and a capacitor (7), (c) a flywheel diode (5) connected between the cathode of the diode (4) and the negative terminal of the capacitor (7), (d) a first voltage comparator (8) for detecting the voltage difference ($\Delta V$) between the output voltage ($V_O$) of the inductance (6) and a reference voltage ($V_R$), (e) a pulse width modulation means (9) for regulating the duty ratio of the switching means (2) in response to the output signal ($\Delta V$) of the first voltage comparator (8), (f) a second voltage comparator (11) for detecting the voltage difference ($\Delta V_1$) between the output voltage ($V_O$) of the inductance (6) and a second reference voltage ($V_{RR}$) which is selected to be less than the first reference voltage ($V_R$), (g) a pulse width modulation means working voltage range expansion means (12) for expanding the maximum duration period ($\Delta T_{max}$) in which the switching means (2) is closed, in response to the output signal ($\Delta V_1$) of the second voltage comparator (11), and a circuit unit (4) for prolonging a time length wherein the DC output voltage ($V_O$) is held, the circuit unit (40) being provided with:

(h) a second capacitor (15) which is connected to the capacitor (1) through a reverse current preventing diode (14) which is connected to the DC power supply in series, (i) a second switching means (16) for by-passing the reverse current preventing diode (14) in response to the output signal ($\Delta V_1$) of the second voltage comparator (11).

Though this switching power supply is substantially identical to the switching power supply in accordance with the first embodiment of this invention, since this switching power supply is a combination of the switching power supply of the second prior art example and a circuit which is the subject matter of the first embodiment of this invention, it is easy to standardize a switching power supply and can improve the versatility thereof.

To achieve the third object, one of the adapters attachable to the foregoing second prior art switching power supply is an adapter provided with:

(h) a second capacitor (15) which is connected to the capacitor (1) through a reverse current preventing diode (14) which is connected to the DC power supply in series, (i) a second switching means (16) for by-passing the reverse current preventing diode (14), and (j) a switching control means (13) for closing the second switching means (16), in response to the second voltage difference signal $\Delta V_1$) successively outputted by the second voltage comparator (11) in a short period.

To achieve the third object, the other of the adapters attachable to the foregoing second prior art switching power supply is an adapter provided with:

(h) a second capacitor (15) which is connected to the capacitor (1) through a reverse current preventing diode (14) which is connected to the DC power supply in series, (i) a second switching means (16) for by-passing the reverse current preventing diode (14) in response to the output signal ($\Delta V_1$) of the second voltage comparator (11).

This adapter attachable to a switching power supply is allowed to satisfy the object identical to the object of the other embodiments of this invention, when being attached to the second prior art switching power supply. Further, this is effective to standardize a switching power supply and to improve the versatility thereof.

BRIEF DESCRIPTION OF THE DRAWINGS

A more detailed description will be presented below for two switching power supplies in accordance with embodiments of this invention and an adaptor in accordance with an embodiment of this invention, referring to the drawings.

DESCRIPTION OF THE PREFERRED EMBODIMENTS

Figure 5:
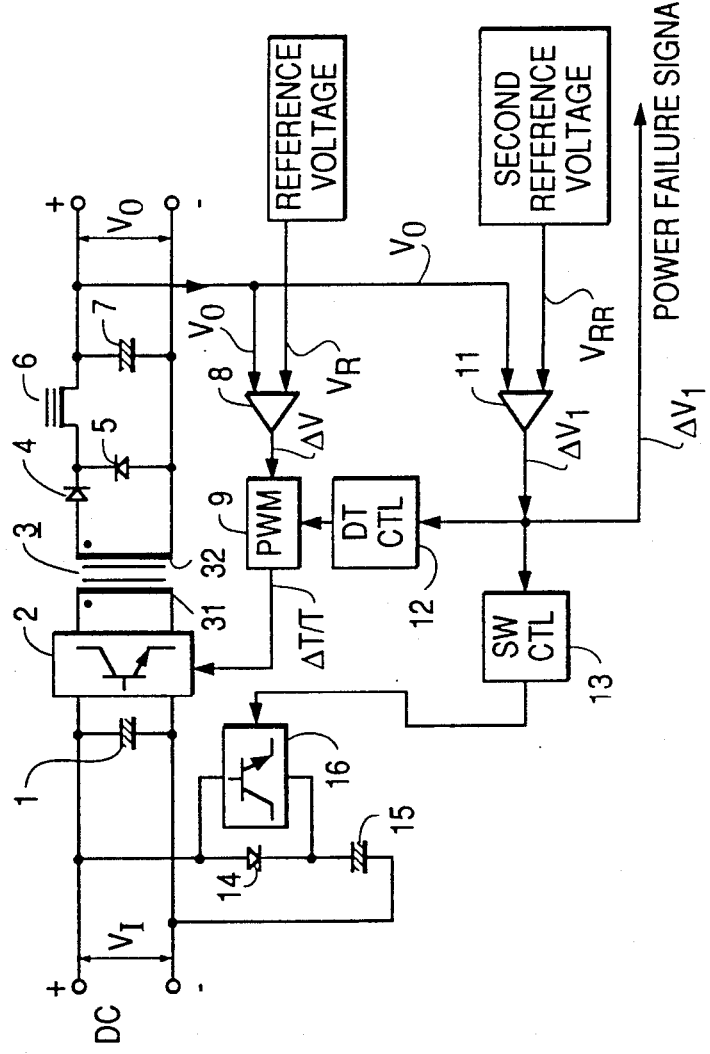
FIG. 5 is a schematic drawing of a switching power supply in accordance with the first embodiment of this invention.

Referring to FIG. 5, the switching power supply in accordance with the first embodiment of this invention is provided with a capacitor 1 connected to a DC power supply, a switching means 2 connected to the capacitor 1, a transformer 3 of which the primary winding 31 is connected to the switching means 2 and of which the secondary winding 32 is connected to a voltage smoothing capacitor 7 through a diode 4 and an inductance 6. The voltage smoothing capacitor 7 supplies a DC voltage $V_O$ through a DC output terminal. Further, when the switching means 2 disconnects the circuit, the electric energy stored in the inductance 6 is discharged through a flywheel diode 5.

A first voltage comparator 8 is provided to compare the DC output voltage $V_O$ and a reference voltage $V_R$ and to output the voltage difference $\Delta V$ to a pulse width modulation means 9, which regulates the duty ratio $\Delta T/T$ of the switching means 2 in response to the foregoing voltage difference $\Delta V$ for the ultimate purpose to maintain the DC output voltage $V_O$ to the reference voltage $V_R$.

The second voltage comparator 11 is provided to compare the DC output voltage $V_O$ and a second reference voltage $V_{RR}$ which is selected to be a little less than the reference voltage $V_R$ and to output the voltage difference $\Delta V_1$ to a pulse width modulation means working voltage range expansion means 12, which increases the predetermined maximum duration period in which the switching means 2 is closed, in response to the voltage difference $\Delta V_1$. This voltage difference $\Delta V_1$ is outputted also to the NC equipment or the like as a power failure signal.

In response to the second voltage difference signal $\Delta V_1$ successively outputted by the second voltage comparator 11 in a short period, or in response to twice arrival of the voltage difference signals $\Delta V_1$ in a short period, the switching control means 13 causes a second switching means 16 to close.

A series circuit of a second capacitor 15 and the parallel circuit of a reverse current preventing diode 14 and the second switching means 16 is connected to the DC input power supply in parallel with the capacitor 1. Particularly in the case where the switching power supply is employed for NC equipment or the like, the capacity of the second capacitor 15 is preferably selected to be much larger than that of the capacitor 1, for example 20 through 25 times as large as that of the capacitor 1. This is because it is effective to prolong the time length wherein the DC output voltage $V_O$ is held, upon a power failure.

When the second switching means 16 is closed, the reverse current preventing diode 14 is short-circuited, resultantly connecting the second capacity 15 directly in parallel with the capacity 1. As a result, the time length wherein the DC output voltage $V_O$ is held is prolonged, upon a power failure.

Figure 6:
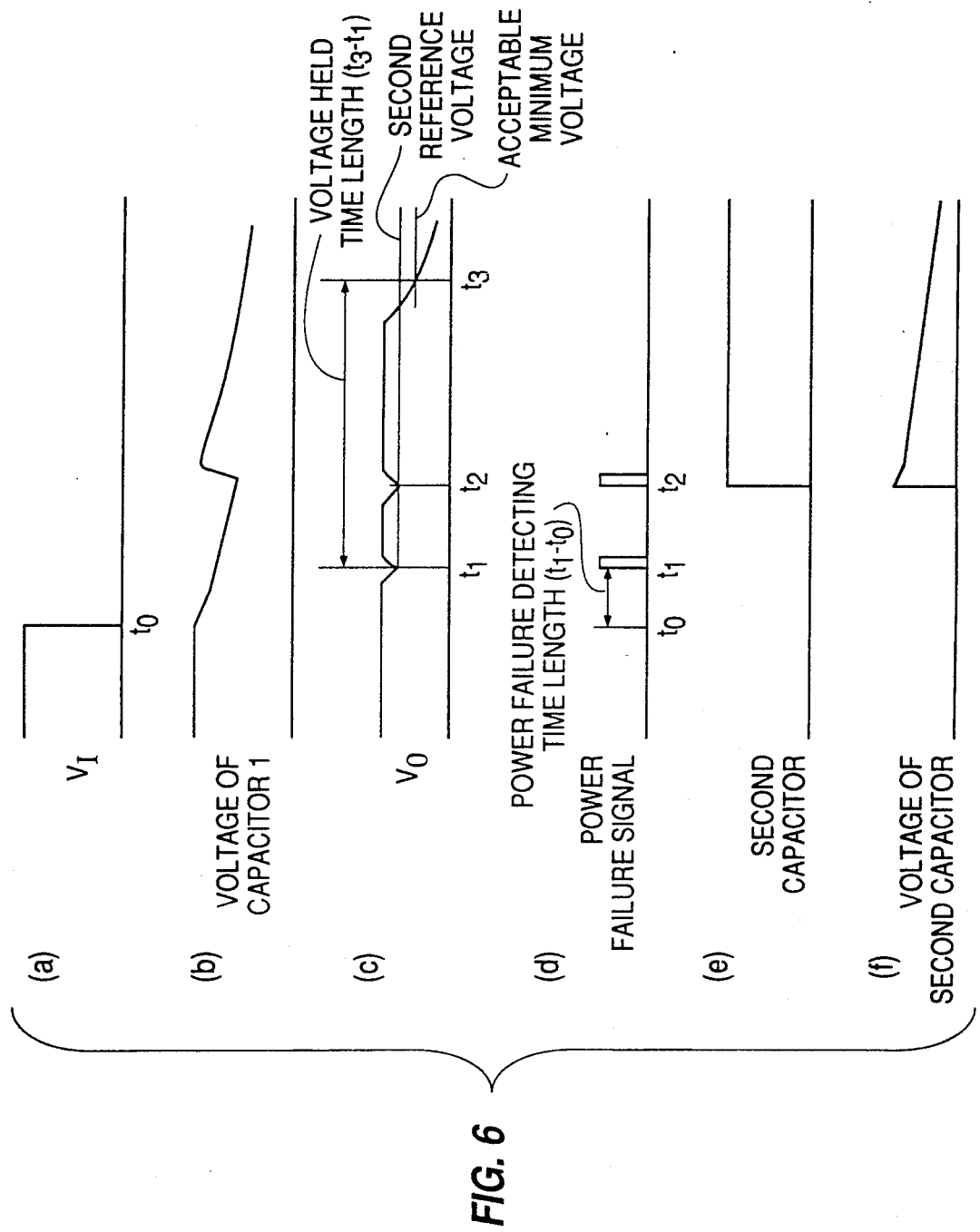
FIG. 6 is a time chart of a switching power supply in accordance with the first embodiment of this invention.

Referring to FIG. 6 and the time chart, shown described below will be the behavior of the switching power supply in accordance with the first embodiment of this invention upon a power failure.

During the period in which the electric power is supplied, the first voltage comparator 8 compares the DC output voltage $V_O$ and the reference voltage $V_R$ to output the voltage difference $\Delta V_1$ in response to which the pulse width modulation means 9 regulates the duty ratio ($\Delta T/T$), with which the switching means 2 regulates the duration period during which the switching means 2 is closed. As a result, the DC output voltage $V_O$ is maintained at the reference voltage $V_R$.

The behavior of the switching power supply upon a power failure will be described below.

As is illustrated in FIG. 6 (a), an input DC power supply is supposed to be suspended at the time $t_O$. As is illustrated in FIG. 6 (b), the voltage of the capacitor 1 gradually decreases. As a result, the DC output voltage $V_O$ begins to decrease. The pulse width modulation means 9, however, functions as soon as the first voltage comparator 8 outputs the voltage difference signal $\Delta V$ in response to a decrease of the DC output voltage $V_O$ down to the reference voltage $V_R$, resultantly maintaining the DC output voltage $V_O$ at the reference voltage $V_R$ until the duration period $\Delta T$ in which the switching means 2 is closed is increased to a predetermined maximum value. When the duration period $\Delta T$ in which the switching means 2 is closed has been increased to the predetermined maximum value, the DC output voltage $V_O$ begins to decrease, and when The DC output voltage $V_O$ has decreased to the second reference voltage $V_{RR}$, the second voltage comparator 11 functions to output the voltage difference $\Delta V_1$ at the time $t_1$. This voltage difference $\Delta V_1$ is outputted to the NC equipment or the like as the signal of power failure, for the purpose to cause the NC equipment or the like to begin the sequential procedure to stop it.

Therefore, the time difference $(t_1 - t_0)$ is the time length for detecting a power failure. The voltage difference $\Delta V_1$ is outputted also to the pulse width modulation means working voltage range expansion means 12, which revises or increases the predetermined maximum value of the duration period $\Delta T_{max}$ which is the maximum value to which the duration period in which the switching means 2 is closed can be increased. Therefore, since the duration period $\Delta T$ in which the switching means 2 is closed is increased, the DC output voltage $V_O$ increases up to the reference voltage $V_R$ and is maintained at the voltage. During the period in which the DC output voltage $V_O$ is maintained at the reference voltage $V_R$, the second voltage comparator 11 does not output any voltage difference signal $\Delta V_1$.

The foregoing sequential steps are virtually identical to those which are for the second prior art example. In this embodiment, however, the voltage difference signal $\Delta V_1$ outputted by the second voltage comparator 11 is inputted also to the switching control means 13 and is memorized therein.

Although the pulse width modulation means 9 again increases the DC output voltage $V_O$ to the reference voltage $V_R$, the DC output voltage $V_O$ begins to decrease third time, after the duration period $\Delta T$ in which the switching means 2 closes has arrived at the revised maximum value, the DC output voltage $V_O$ begins to decrease.

When the DC output voltage $V_O$ decreases again to the second reference voltage $V_{RR}$, the second voltage comparator 11 works again and outputs the voltage difference signal $\Delta V_1$ again toward the switching control means 13 at the time illustrated by $t_2$ in FIG. 6 (c).

In response to this second voltage difference signal $\Delta V_1$ successively outputted in a short period, or in response to twice outputs of the voltage difference signal $\Delta V_1$ in a short period, the switching control means closes the second switching means 16 and connects the second capacitor 15 in parallel with the capacitor 1, resultantly considerably increasing the quantity of the electric charge which is employable to supply electric power out of this switching power supply. As a result, the DC output voltage $V_O$ increases third time to the reference voltage $V_R$, as is illustrated in FIG. 6 (c). At the beginning of this step, the pulse width modulation means 9 decreases the duration period $\Delta T$ in which the switching means 2 is closed.

As the electric charge stored in the capacitors 1 and 15 decreases, the pulse width modulation means 9 increases the duration period $\Delta T$ in which the switching means 2 is closed, to maintain the DC output voltage $V_O$ at the reference voltage $V_R$. After the duration period $\Delta T$ reaches the revised maximum value, the DC output voltage $V_O$ gradually decreases, as is illustrated in FIG. 6 (c) and continues decreasing beyond the minimum voltage with which the NC equipment or the like is allowed to stop the function thereof without being accompanied by any malfunction, at the time $t_3$ illustrated in FIG. 6 (c).

The foregoing description has clarified that the switching power supply in accordance with the first embodiment of this invention is allowed to realize a longer time length wherein the DC output voltage $V_O$ is held $(t_3 - t_1)$, because the elctrostatic capacity employable for supplying electric power can be increased by connecting the second capacitor 15 in parallel with the capacitor 1, when it is required, although the time length for detecting a power failure $(t_1 - t_0)$ illustrated in FIG. 6 (d) is identical to that for the second prior art example.

Cases are often wherein the switching control means 13 is required to be eliminated. In other words, in response to the voltage difference signal $\Delta V_1$, the pulse width modulation means working voltage range expansion means 12 and the second switching means 16 are allowed to simultaneously work for the purpose to prolong the time length $(t_3 - t_1)$ wherein the DC output voltage $V_O$ is held. This is because the structure of the switching control means 13 is rather complicated, despite the advantage caused by the foregoing sequential operation to be conducted in response to the voltage difference signal $\Delta V_1$, including the first step in which the pulse width modulation means working voltage range expansion means 12 works and the second step in which the second switching means 16 works in succession, is rather limited. This means that there is no reason why the connection of the second capacitor 15 in parallel with the capacitor 1 is desirably delayed until some length of time has passed after the pulse width modulation means working voltage range expansion means 12 functioned.

Since the switching power supply in accordance with this embodiment is provided with a means for detecting a power failure of the DC output voltage $V_O$, it is influenced neither by any instantaneous voltage drop in the AC circuit nor by any distortion of the AC voltage wave form. Further, since the electrostatic capacity of the capacitor 1 is allowed to be selected to be as least as required within the ordinary design rule, the switching power supply can be small in dimension and short in the time length for detecting a power failure.

The foregoing description has clarified that the switching power supply is provided with :

a second capacitor 15 having a fairly large capacity, the capacitor 15 being always charged but being disconnected from the circuit, and a second switching means 16 which connects the second capacitor 15 in parallel with the first capacitor 1, in response to the second voltage signal $\Delta V_1$ outputted by the second voltage comparator 11 successively in a short period or in response to a voltage signal outputted by the second voltage comparator 11 under a condition that the duration period $\Delta T$ in which the switching means 2 is closed is prolonged by the pulse width modulation means working voltage range expansion means 12, or occasionally in response to a voltage difference signal $\Delta V_1$ outputted by the second voltage comparator 11 under a condition in which the pulse width modulation means working voltage range expansion has not yet worked. Resultantly, the time length wherein the DC output voltage $V_O$ is held is prolonged to the time length ($t_3-t_1$) between the time $t_1$ at which the second voltage comparator 11 outputs the first voltage difference $\Delta V_1$ and the time $t_3$ at which the DC output voltage $V_O$ has decreased to the least voltage with which NC equipment or the like is allowed to stop the function thereof without being accompanied by a malfunction, because the second capacitor 15 is connected in parallel to the capacitor 1 and because the duration period $\Delta T$ in which the switching means 2 is closed is sufficiently prolonged by the pulse width modulation means working voltage range expansion means 12. As a result, the switching power supply in accordance with this embodiment is allowed to fully use the electrostatic capacity of the capacitor 1 and to realize a long duration period in which the DC output voltage $V_O$ is held higher than the least voltage with which NC equipment or the like can stop the function without being accompanied by a malfunction.

The second embodiment of the present invention has a function identical to that of the first is a combination of a switching power supply unit which is virtually identical to the foregoing second prior art switching power supply and an adapter for realizing the function identical to that of the first embodiment of this invention.

Figure 7:
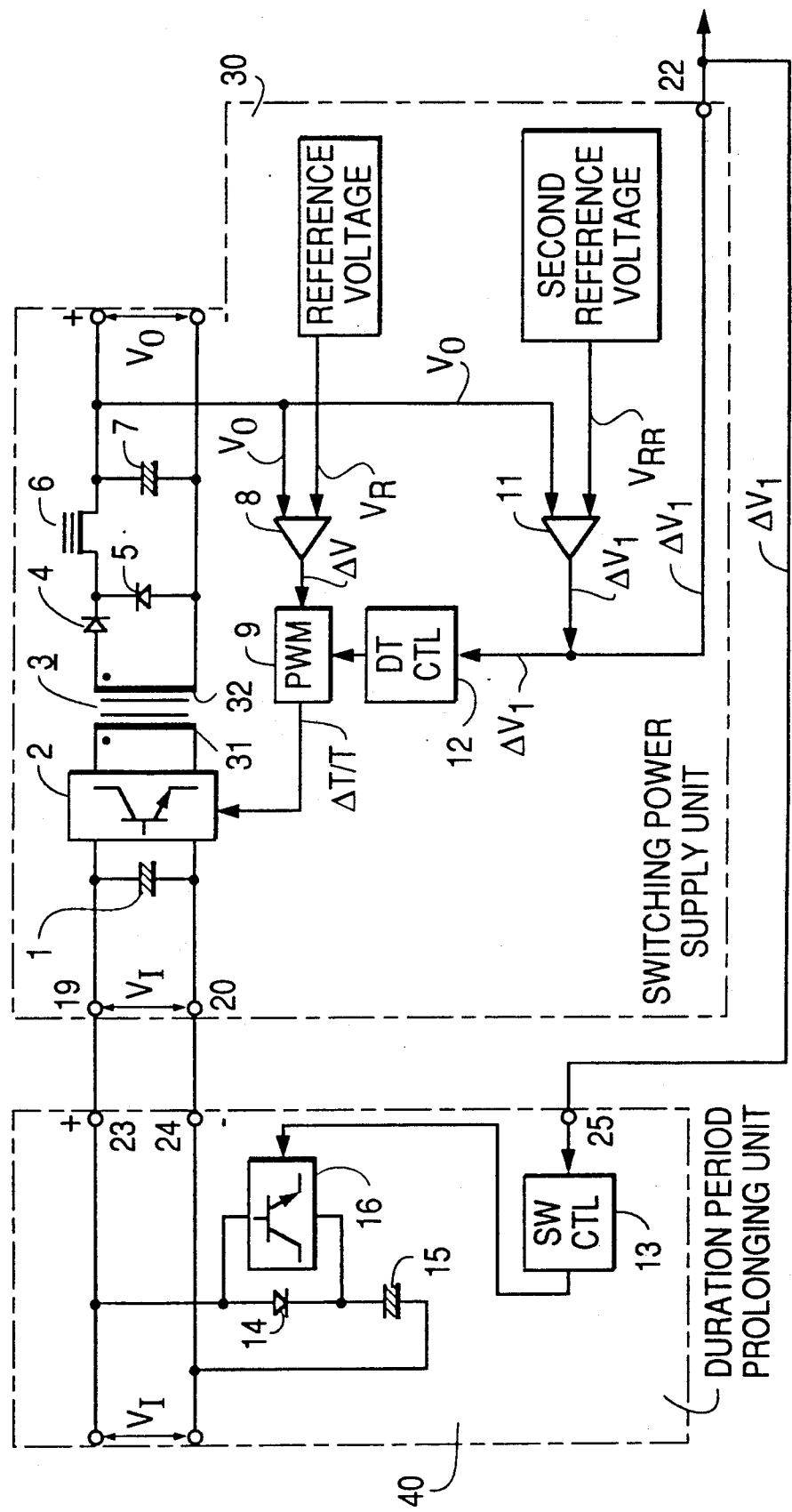
FIG. 7 is a schematic drawing of a switching power supply in accordance with the second embodiment of this invention.

Referring to FIG. 7, the switching power supply in accordance with the second embodiment of this invention is provided with the members symbolized 1-16 virtually identical to those of the first embodiment. However, the members 1-12 are arranged in a switching power supply unit 30 and the members 13-16 are arranged in a duration period prolonging unit 40. These two units are connected to each other by the power line terminals 19 and 20 of the switching power supply unit 30 and the power line terminals 23 and 24 of the duration period prolonging unit 40 and by the signal line terminal 22 of the former and the signal line terminal 25 of the latter. The signal line terminal 22 is also connected to NC equipment or the like to output a power failure signal. The function of this switching power supply is identical to that of the switching power supply of the first embodiment of this invention.

Figure 8:
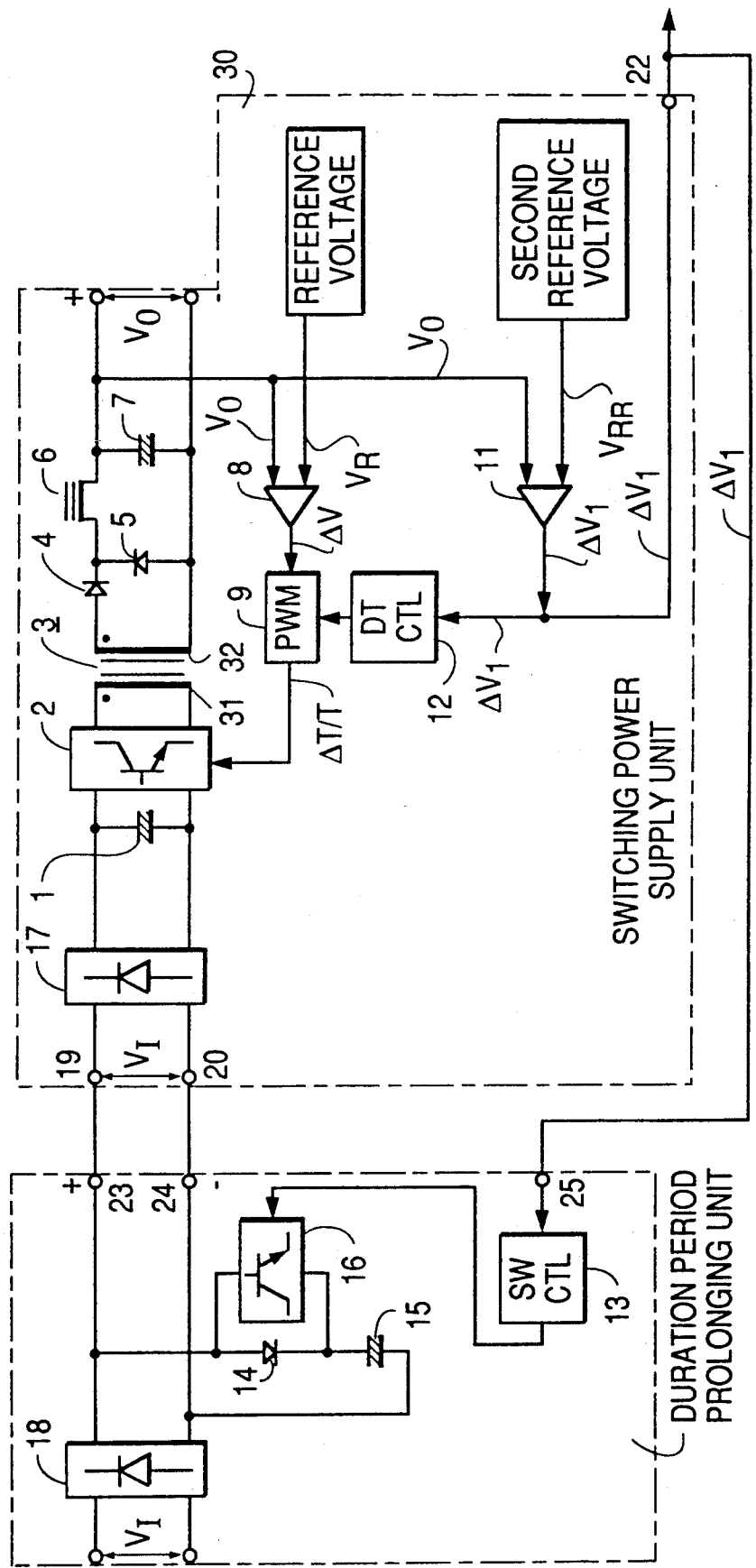
FIG. 8 is a schematic drawing of a switching power supply in accordance with a modification of the second embodiment of this invention.

Since the major object of this embodiment is standardization, versatility is very important for each unit 30 or 40, Therefore, each unit 30 or 40 is preferably provided with a rectifier 17 or 18, as is illustrated in FIG. 8 attached by a by-passlines (not shown) which are employed in the case where the rectifiers are unnecessary.

The third embodiment of the present invention includes an adapter for a switching power supply, the adapter being effective to prolong the duration period is virtually identical to the duration period prolonging unit 40 of the second embodiment of this invention.

Figure 1:
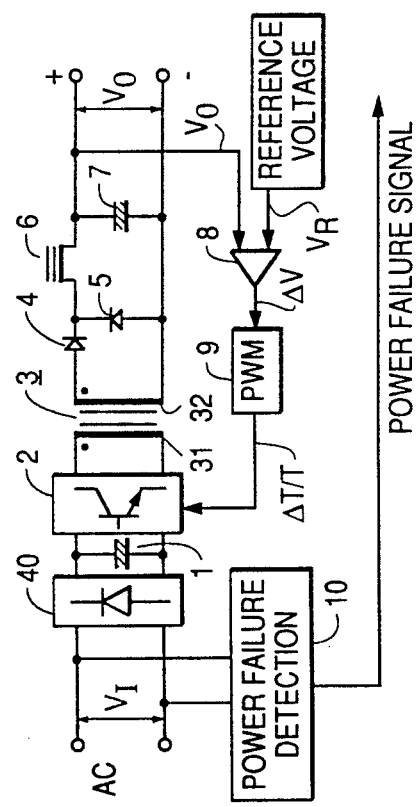
FIG. 1 is a schematic drawing of a switching power supply in accordance with a first prior art example.
Figure 2:
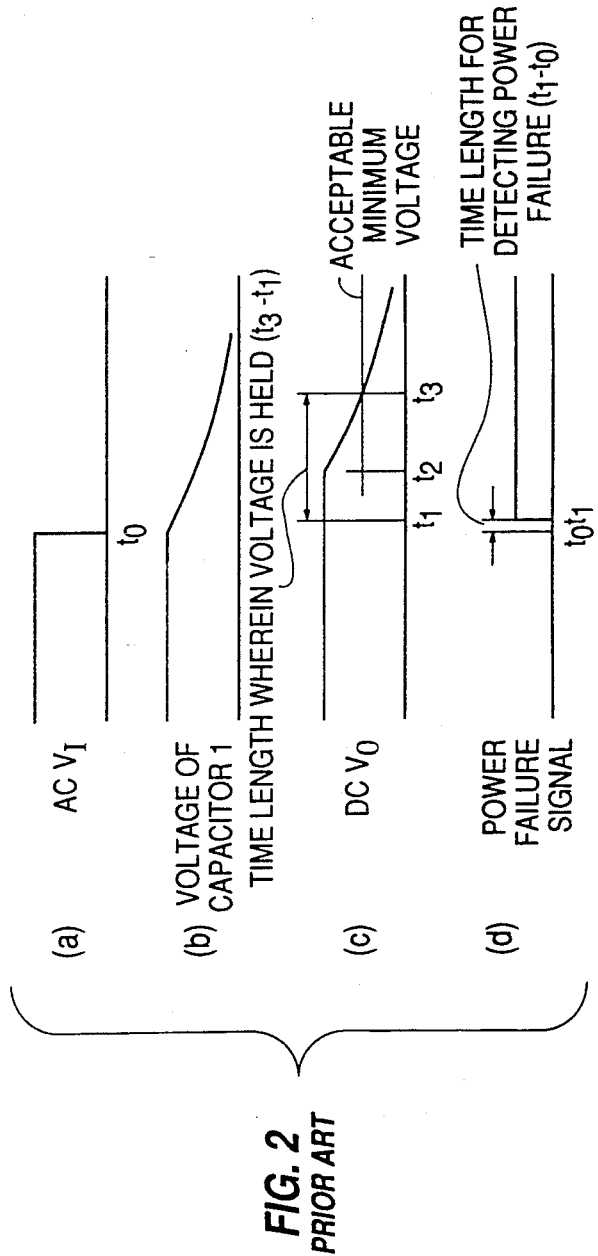
FIG. 2 is a time chart of a switching power supply in accordance with a first prior art example.
Figure 3:
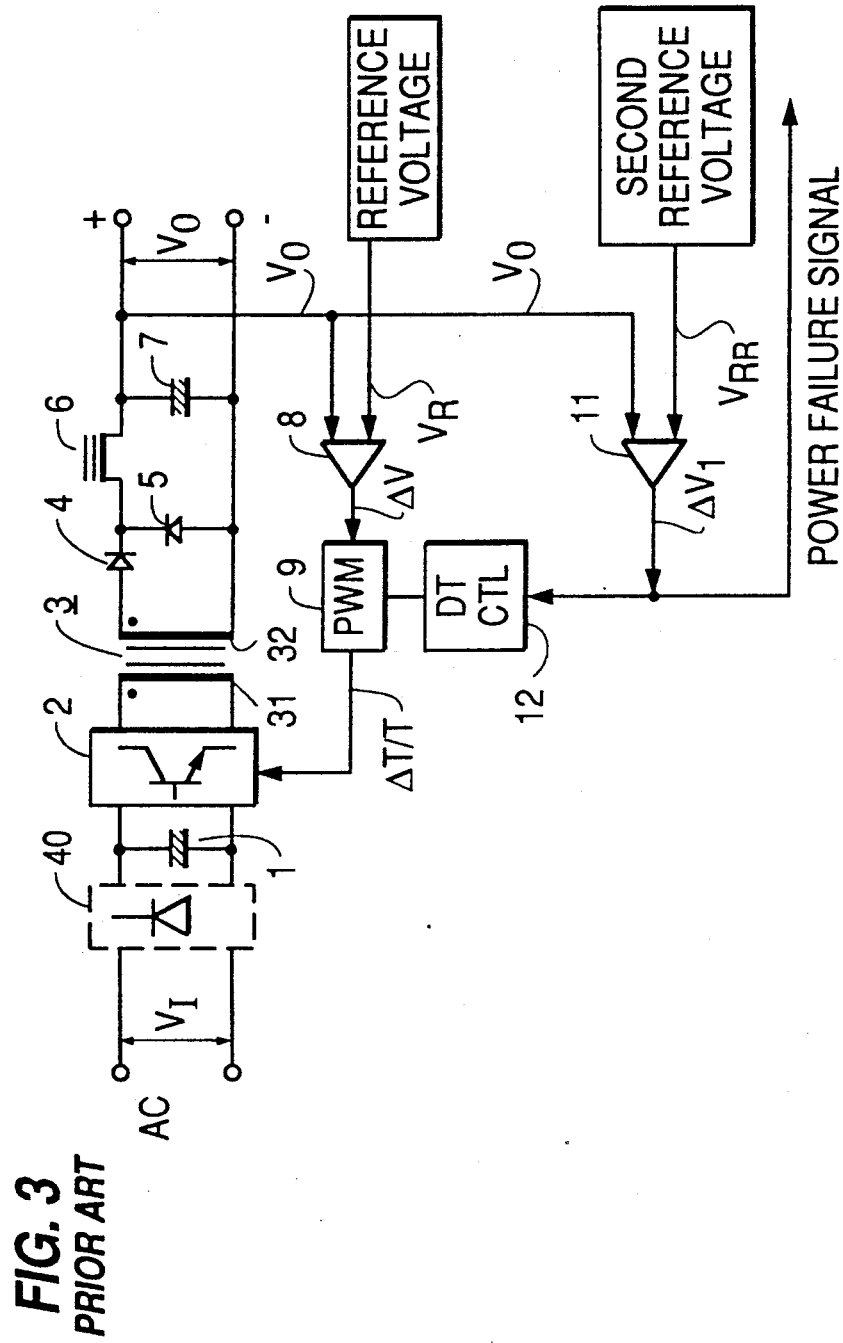
FIG. 3 is a schematic drawing of a switching power supply in accordance with a second prior art example.
Figure 4:
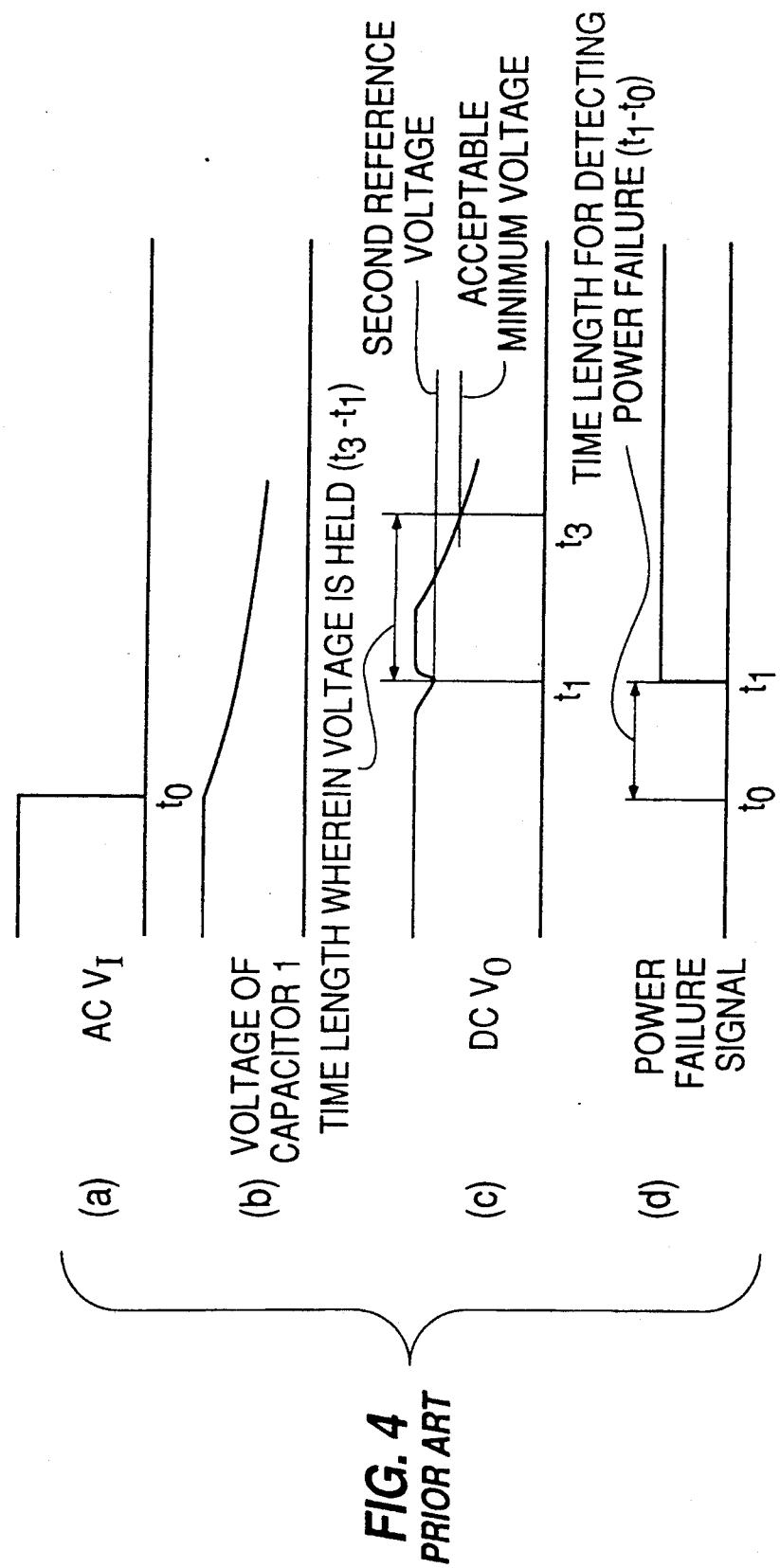
FIG. 4 is a time chart of a switching power supply in accordance with a second prior art example.
Figure 9:
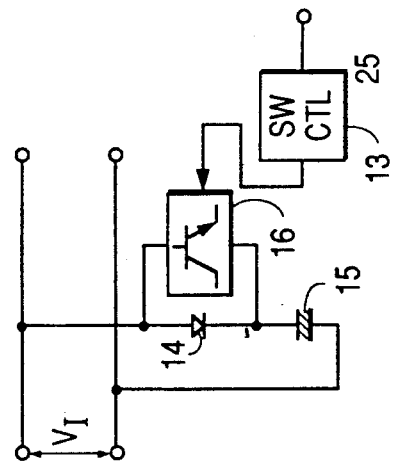
FIG. 9 is a schematic drawing of an adapter attachable to the second prior art switching power supply.

Referring to FIG. 9, the adapter for switching power supply in accordance with the third embodiment of this invention is identical to the duration period prolonging unit, and it is employed together with the switching power supply available in the prior art.

The foregoing description has clarified that this invention has successfully provided two switching power supplies and an adapter for a switching power supply having the advantages described below.

The switching power supply in accordance with the first or second embodiment of this invention is quick in detecting a power failure, insensitive to an instantaneous voltage drop in the AC circuit and distortion in the wave form of the AC input voltage, resultantly being reliable in detection of a power failure. Further, it has a longer time length wherein the DC output voltage $V_O$ is held higher than the minimum voltage with which NC equipment or the like stops the function without being accompanied by a malfunction, resultantly preventing NC equipment or the like from making a malfunction and preventing an NC machine tool or the like controlled thereby from incurring any potential damage or the like.

In addition to the advantages presented above, the switching power supply in accordance with the second embodiment of this invention is convenient for standardization and is versatile in employment thereof.

The adapter for a switching power supply can be employed by being adapted to the switching power supply available in the prior art, the employment being made to prolong the time length wherein the DC output voltage $V_O$ is held higher than the minimum voltage with which NC equipment or the like stops the function without being accompanied by a malfunction.

Though the foregoing description was presented referring to specific embodiments, this is not meant to be construed in a limiting sense. Various modifications of a disclosed embodiment, as well as other embodiments of this invention, will be apparent to persons skilled in the art upon reference to the description of this invention. It is therefore contemplated that the appended claims will cover any such modifications or embodiments as fall within the true scope of the invention.

We claim:

1. A switching power supply comprising:
    a capacitor (1) connected to a DC power supply,
    a transformer (3) of which the primary winding (31) is connected to said capacitor (1) through a switching means (2) and of which the secondary winding (32) is connected to a series circuit comprising a diode (4), an inductance (6) and a capacitor (7),
    a flywheel diode (5) connoted between the cathode of said diode (4) and the negative terminal of said capacitor (7),
    a first voltage comparator means (8) for detecting the voltage difference ($\Delta V$) between the DC output voltage ($V_O$) of said inductance (6) and a reference voltage ($V_R$),
    a pulse width modulation means (9) for regulating the duty ratio ($\Delta T/T$) of said switching means (2) in response to the output signal ($\Delta V$) of said first voltage comparator (8), a second voltage comparator means (11) for detecting the voltage difference (ΔVhd 1) between the output voltage ($V_O$) of said inductance (6) and a second reference voltage ($V_{RR}$) which is selected to be less than said first reference voltage ($V_R$), and a pulse width modulation means working voltage range expansion means (12) for expanding the maximum duration period ($t_{max}$) in which said switching means (2) is closed, in response to the output signal ($\Delta V_1$) of said second voltage comparator (11), further comprising:

a second capacitor (15) connected to said capacitor (1) through a reverse current preventing diode (14) which is connected to said DC power supply in series, and a second switching mean (16) for by-passing said reverse current preventing diode (14), said second switching means (16) working in response to a switching control means (13) which works in response to the second voltage difference signal ($\Delta V_1$) successively outputted by said second voltage comparator (11) in a short period.

2. A switching power supply comprising:

a switching power supply unit comprising:

a capacitor (1) connected to a DC power supply, a transformer (3) of which the primary winding (31) is connected to said capacitor (1) through a switching means (2) and of which the secondary winding (32) is connected to a series circuit comprising a diode (4), and inductance (6) and a capacitor (7), a flywheel diode (5) connected between the cathode of said diode (4) and the negative terminal of said capacitor (7), a first voltage comparator means (8) for detecting the voltage difference ($\Delta V$) between the DC output voltage ($V_O$) of said inductance (6) and a reference voltage ($V_R$), a pulse width modulation means (9) for regulating the duty ratio ($\Delta T/T$) of said switching means (2) in response to the output signal ($\Delta V$) of said first voltage comparator (8), a second voltage comparator means (11) for detecting the voltage difference ($\Delta V_1$) between the output voltage ($V_O$) of said inductance (6) and a second reference voltage ($V_{RR}$) which is selected to be less than said first reference voltage ($V_R$), and a pulse width modulation means working voltage range expansion means (12) for expanding the maximum duration period ($T_{max}$) in which said switching means (2) is closed, in response to the output signal ($\Delta V_1$) of said second voltage comparator (11), and a duration period prolonging unit (40) for prolonging a time length wherein a DC output voltage ($V_O$) is held comprising:

a second capacitor (15) connected to said capacitor (1) through a reverse current preventing diode (14) which is connected to said DC power supply in series, and a second switching means (16) for by-passing said reverse current preventing diode (14), said second switching means (16) working in response to a switching control means (13) which works in response to the second voltage difference signal ($\Delta V_1$) successively outputted by said second voltage comparator (11) in a short period.

3. A switching power supply comprising:

a capacitor connected to a DC power supply, a transformer of which the primary winding is connected to said capacitor through a switching means and of which the secondary winding is connected to a series circuit comprising a diode, an inductance and a capacitor, a flywheel diode connected between the cathode of said diode and the negative terminal of said capacitor, a first voltage comparator means for detecting the voltage difference between the DC output voltage ($V_O$) of said inductance and a reference voltage ($V_R$), a pulse width modulation means for regulating the duty ration ($\Delta T/T$) of said switching means (2) in response to the output signal ($\Delta V$) of said first voltage comparator (8), a second voltage comparator means for detecting the voltage difference ($\Delta V_1$) between the output voltage ($V_{RR}$) which is selected to be less than said first reference voltage ($V_R$), and a pulse width modulation means working voltage range expansion means for expanding the maximum duration period ($T_{max}$) in which said switching means (2) is closed, in response to the output signal ($\Delta V_1$) of said second voltage comparator (11), further comprising;

a second capacitor connected to said capacitor through a reverse current preventing diode which is connected to said DC power supply in series, and a second switching means for bypassing said reverse current preventing diode, said second switching means working in response to said output signal ($\Delta V_1$) of said second voltage comparator.

4. A switching power supply comprising:

a switching power supply unit comprising:

a capacitor connected to a DC power supply, a transformer of which the primary winding is connected to said capacitor through a switching means and of which the secondary winding is connected to a series circuit comprising a diode, an inductance and a capacitor, a flywheel diode connected between the cathode of said diode and the negative terminal of said capacitor, a first voltage comparator means for detecting the voltage difference ($\Delta V$) between the DC output voltage ($V_O$) of said inductance and a reference voltage ($V_R$), a pulse width modulation means for regulating the duty ratio ($\Delta T/T$) of said switching means in response to the output signal ($\Delta V$) of said first voltage comparator, a second voltage comparator means for detecting the voltage difference ($\Delta V_1$) between the output voltage ($V_O$) of said inductance and a second reference voltage ($V_{RR}$) which is selected to be less than said first reference voltage ($V_R$), and a pulse width modulation means working voltage range expansion means for expanding the maximum duration period ($\Delta T_{max}$) in which said switching means is closed, in response to the output signal ($\Delta V_1$) of said second voltage comparator, and a duration period prolonging unit for prolonging a time length wherein a DC output voltage ($V_O$) is held comprising;

a second capacitor connected to said capacitor through a reverse current preventing diode which is connected to said DC power supply in series, and a second switching means for by-passing said reverse current preventing diode, said second switching means working in response to said output signal ($\Delta V_1$) of said second voltage comparator.

* * * * *

UNITED STATES PATENT AND TRADEMARK OFFICE
CERTIFICATE OF CORRECTION

PATENT NO. : 5,170,070
DATED : DECEMBER 8, 1992
INVENTOR(S) : MASAYUKI HATTORI ET AL.

It is certified that error appears in the above-indentified patent and that said Letters Patent is hereby corrected as shown below:

Col. 2, line 21, "(T$\Delta$T)" should be --(T-$\Delta$T)--.

Col. 5, line 66, "is to" should be --is allowed to--.

Col. 6, line 4, "ma" should be --machine tool--.

Col. 8, line 23, "$\Delta V_1$)" should be --($\Delta V_1$)--.

Col. 9, line 23, "$\Delta V_1$)" should be --($\Delta V_1$)--.

Col. 10, line 23, "$\Delta T/T$)" should be --($\Delta T/T$)--.

Col. 11, line 24, "The" should be --the--.

Col. 13, line 16, "expansion has" should be --expansion means 12 has--;
         line 39, "first is" should be --first embodiment but is--.

Col. 14, line 58, "connoted" should be --connected--.

UNITED STATES PATENT AND TRADEMARK OFFICE
CERTIFICATE OF CORRECTION

PATENT NO. : 5,170,070
DATED : December 8, 1992
INVENTOR(S) : Masayuki Hattori et al It is certified that error appears in the above-indentified patent and that said Letters Patent is hereby corrected as shown below:

Col. 15, line 2, "$(\Delta Vhd1)$" should be --$(\Delta V_1)$--;
        line 8, "$(t_{max})$" should be --$(T_{max})$--;
        line 16, "mean" should be --means--.

Col. 16, line 18, "ration" should be --ratio--.

Signed and Sealed this

Fourteenth Day of June, 1994

BRUCE LEHMAN

*Attest:*

*Attesting Officer*    Commissioner of Patents and Trademarks